United States Patent [19]

Matsumoto et al.

[11] Patent Number: 4,990,475
[45] Date of Patent: Feb. 5, 1991

[54] ALUMINA-SPINAL MONOLITHIC REFRACTORIES

[75] Inventors: Osami Matsumoto; Toshihiro Isobe, both of Hyogo; Teruyuki Nishitani; Takashi Genba, both of Aichi, all of Japan

[73] Assignees: Harima Ceramic Co. Ltd., Hyogo; Nippon Steel Corporation, Tokyo, both of Japan

[21] Appl. No.: 495,714

[22] Filed: Mar. 16, 1990

[30] Foreign Application Priority Data

Aug. 29, 1987 [JP] Japan ................................ 62-216167

[51] Int. Cl.$^5$ ...................... C04B 35/02; C04B 35/04
[52] U.S. Cl. .................................... 501/120; 501/108; 501/118; 501/119; 106/692
[58] Field of Search ............... 501/108, 118, 119, 120, 501/122, 124, 127, 128; 106/104

[56] References Cited

U.S. PATENT DOCUMENTS

| | | | |
|---|---|---|---|
| 3,577,249 | 5/1971 | McKenna | 106/62 |
| 3,953,563 | 4/1976 | Kihlstedt et al. | 264/66 |
| 4,331,773 | 5/1982 | Hongo et al. | 501/128 |
| 4,400,474 | 8/1983 | Copperthwaite et al. | 501/119 |
| 4,729,974 | 3/1988 | Nazirizadeh et al. | 501/120 |
| 4,751,204 | 6/1988 | Kyoden et al. | 501/89 |
| 4,780,434 | 10/1988 | Watanabe et al. | 501/120 |
| 4,833,109 | 5/1989 | Macey et al. | 501/120 |

FOREIGN PATENT DOCUMENTS

| | | |
|---|---|---|
| 0088811 | 8/1978 | Japan ................................. 501/119 |
| 55-23004 | 2/1980 | Japan . |
| 59-128271 | 7/1984 | Japan . |
| 60-60985 | 4/1985 | Japan . |
| 64-87577 | 3/1989 | Japan . |

Primary Examiner—William R. Dixon, Jr.
Assistant Examiner—Michael A. Marcheschi
Attorney, Agent, or Firm—Wenderoth, Lind & Ponack

[57] ABSTRACT

An alumina-spinel monolithic refractory consists essentially of 50-90 percent by weight of alumina clinker, 5-40 percent by weight of MgO—Al$_2$O$_3$ spinel clinker not larger than 1 mm in size and 1-25 percent by weight of alumina cement. Another alumina-spinel monolithic refractory consists essentially of 50-90 percent by weight of alumina clinker, 5-40 percent by weight of MgO—Al$_2$O$_3$ spinel clinker, 1-25 percent by weight of alumina cement and not more than 5 percent by weight of magnesia clinker. The alumina-spinel monolithic refractories are used for lining the inner walls of ladles, vacuum degassing vessels, hot-metal mixers, blast-furnace troughs and their covers, not-metal mixer cars, tundishes and the like.

8 Claims, 3 Drawing Sheets

ALUMINA-SPINAL MONOLITHIC REFRACTORIES

BACKGROUND OF THE INVENTION

This invention relates to highly durable alumina-spinel monolithic refractories.

Alumina monolithic refractories have been commonly used for lining ladles, vacuum-degassing vessels, hot-metal mixers, blast-furnace troughs and their covers, hot-metal mixer cars, tundishes and the like. However, they are damaged as a result of erosion caused by FeO, MnO or CaO contained in the molten metal or slag or as a result of structual spalling induced by the penetration of slag. To prevent the penetration of the slag, all attempts have been made to add carbon, silicon carbide and other elements that are less likely to be wet by slag. However, it has been found that such added elements do not function properly when they become oxidized. When added in large quantities, furthermore, they have proved to cause structural deterioration and heavier erosion upon oxidation.

Alumina-spinel monolithic refractories combined with $MgO-Al_2O_3$ spinel clinker (hereinafter called spinel clinker) have also been proposed. Japanese Provisional Patent Publication No. 55-23004, for example, discloses a material consisting of 10–85 percent by weight of spinel clinker, 5–30 percent by weight of alumina, and 10–25 percent by weight of high-alumina cement. Japanese Provisional Patent Publication No. 59-128271 discloses a material consisting of 50–95 percent by weight of spinel and a remainder of aluminum oxide. Japanese Provisional Patent Publication No. 60–60985 discloses a material consisting of at least 60 parts by weight of spinel clinker, 10–35 parts by weight of alumina clinker and 10–10 parts by weight of alumina cement. Spinel clinkers are free of the problems associated with oxidation. When combined with alumina clinker, they become less likely to produce low melting point substances.

Conventional alumina spinel monolithic refractories have been useful as refractories for various applications, notably for ladles and vacuum degassing vessels. Recently, however, furnaces have come to be operated under increasingly severe conditions. Also, there is a pressing need to decrease the consumption of refractories. Therefor, more durable monolithic refractories are in great demand.

SUMMARY OF THE INVENTION

The present inventors discovered that the resistance of alumina-spinel monolithic refractories to erosion and slag penetration is remarkably improved when more alumina clinker than in conventional refractories is mixed together with specific amounts of fine spinel clinkers not larger than 1 mm.

A first alumina-spinel monolithic refractory according to this invention consists of 50-90 percent by weight of alumina clinker, 5-40 percent by weight of $MgO-Al_2O_3$ spinel clinker not larger than 1 mm in size, and 1-25 percent by weight of alumina cement.

The present inventors also discovered that magnesia clinker added to the above-described first refractory reacts with the alumina clinker contained in the refractory to produce spinel at high temperatures. Reacting at high temperatures, magnesia clinker and alumina clinker form a spinel with an expansion in volume. The permanent linear change after firing becomes that of expansion. This expansion proved to remarkably reduce cracking that might result from contraction. A second alumna-spinel monolithic refractory of this invention consists of 50-90 percent by weight of alumina clinker, 5-40 percent by weight of $MgO-Al_2O_3$ spinel clinker not larger than 1 mm in size, 1-25 percent by weight of alumina cement and not more than 5 percent by weight of magnesia clinker.

DESCRIPTION OF THE PREFERRED EMBODIMENTS

Either electro-fused or sintered spinel clinker/ or a combination of the two types/ may be used in the preparation of monolithic refractories according to this invention. The ratio of MgO to $Al_2O_3$ that make up the spinel may but need not coincide with the theoretical ratio. The mole ratio of MgO to $Al_2O_3$ may be within the range of, for example, 0.7:1.3 to 1.3:0.7. The spinel clinker having a composition within this range can be chosen from among commercially available ones.

Figure 1:
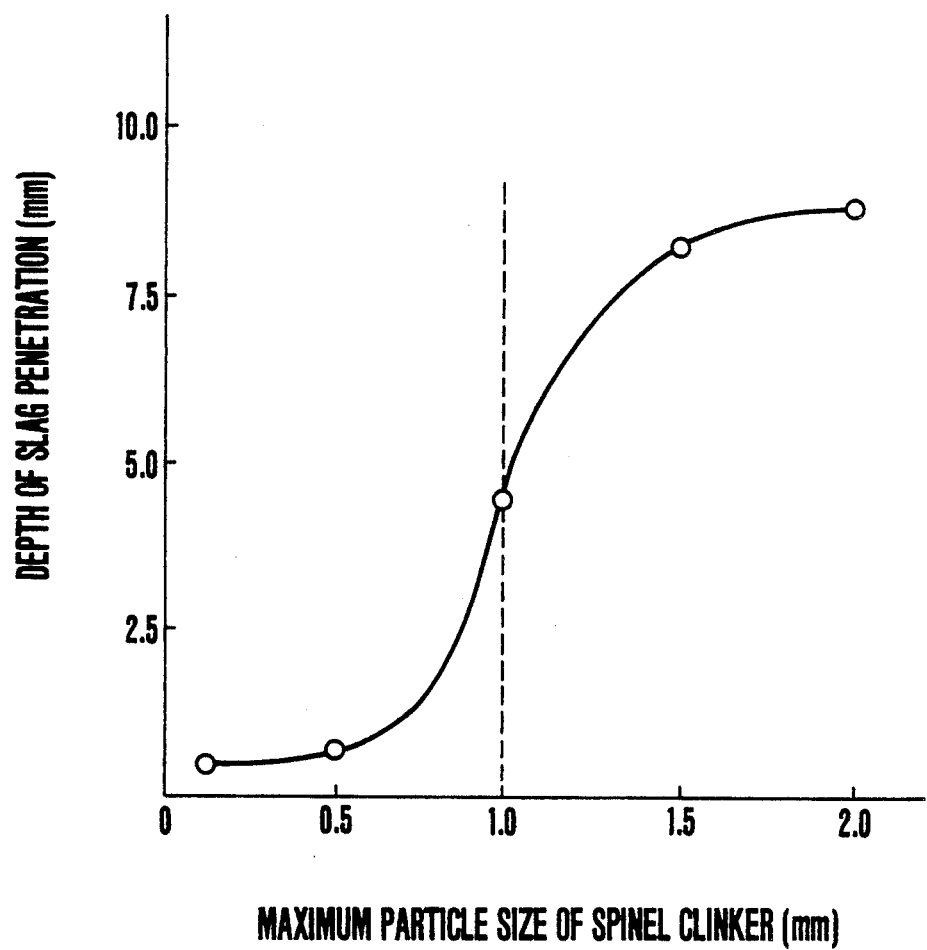
FIG. 1 graphically shows the relationship between the particle size of spinel clinker and the resistance to slag penetration.

FIG. 1 graphically shows the relationship between the maximum particle size of spinel clinker and the resistance of alumina-spinel monolithic refractories to slag penetration. The penetration of slag was measured by the same method as was used with the preferred embodiments described later. The refractories consisted of 70 percent by weight of sintered alumina clinker, 20 peccant by weight of sintered spinel clinker and 10 percent by weight of alumina cement.

As is obvious from FIG. 1, the refractories containing spinel clinker not larger than 1 mm in particle size exhibit good resistance to slag penetration. The resistance becomes more pronounced with refractories having spine clinker of 0.5 mm or smaller. It is thought that fine-grained spinel clinker uniformly and closely fills the gaps in matrix, and that the spinel clinker then prevents the penetration of slag by completely turning FeO and MnO in the slag into a solid solution. When the particle size of spinel clinker is coarser, by contrast, slag will penetrate inward through the openings left between the individual particles thereof.

Figure 2A:
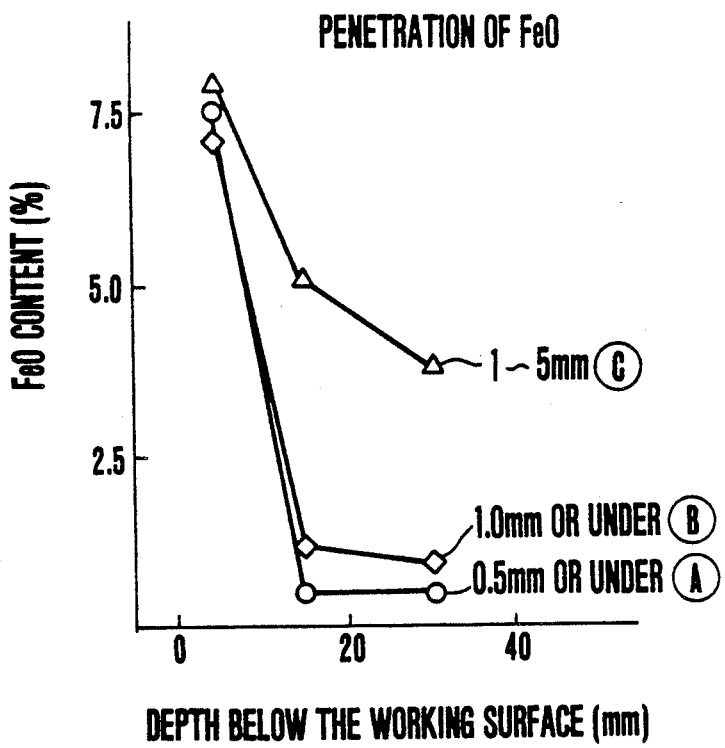
FIGS. 2a and 2b graphically show the penetration of FeO and MnO in slag determined by on-ladle tests.
Figure 2B:
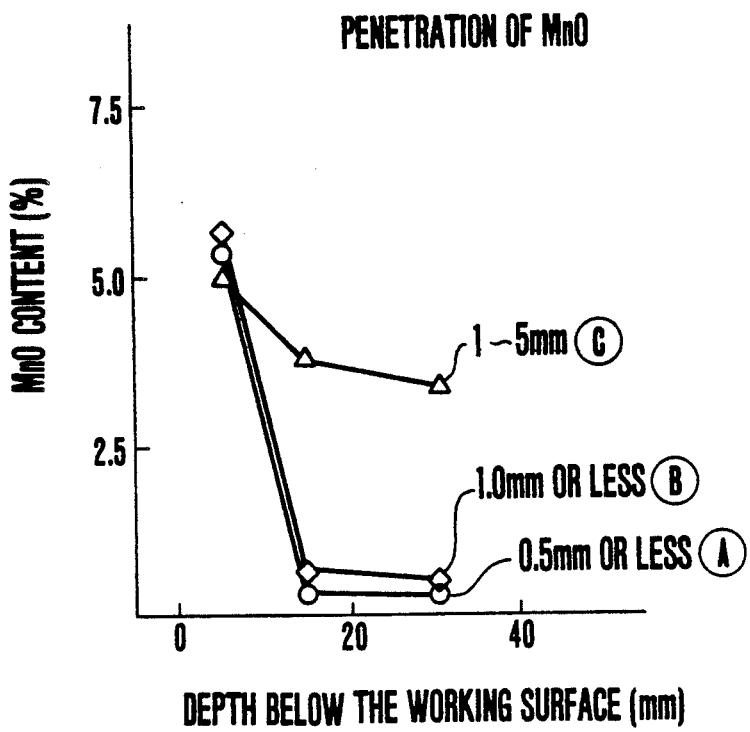
Figure 3:
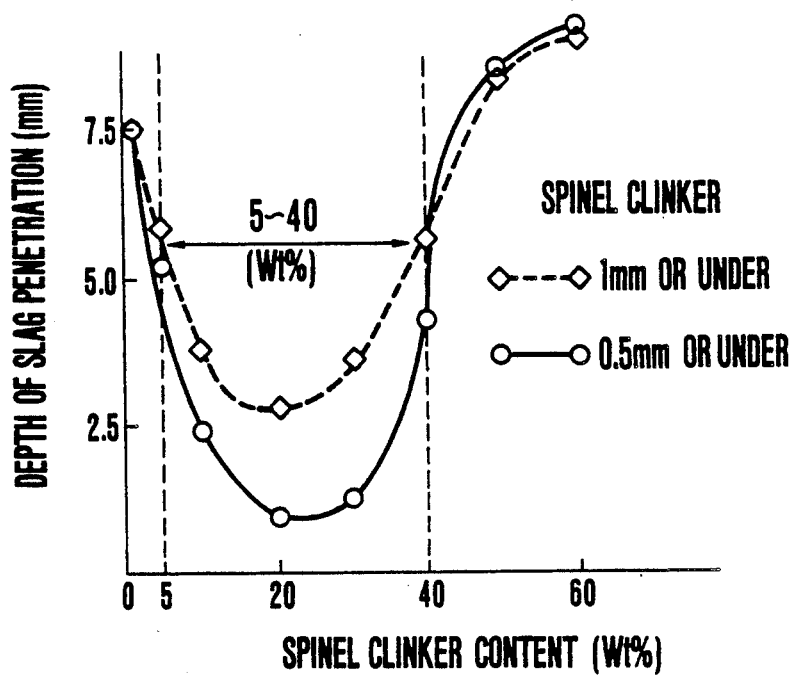
FIG. 3 graphically shows the relationship between the mixing ratio of spinel clinker and the resistance to slag penetration.

FIGS. 2a and 2b show the penetration of FeO and MnO, respectively, into steel ladles lined with three different types of monolithic refractories A, B, and C prepared under the same conditions as those used in the preparation of the refractories shown in FIG. 1, using spinel clinkers not larger than 0.5 mm, not larger than 1 mm, and from 1 mm to 5 mm in particle size, respectively. The particle size of the spinel clinker contained in monolithic refractories A and B was within the range according to this invention. Slag penetration with refractories A and B was limited substantially to the working surface and was not very deep. Five to 40 percent by weight of spinel clinker not larger than 1 mm or 0.5 mm produces satisfactory results, with the best result obtained at approximately 20 percent by weight. FIG. 3 shows the slag penetration with monolithic refractories A and B containing spinel clinker not larger than 1 mm and 0.5 mm, respectively. The amount of spinel clinker not larger than 1 mm is preferably 10-30 percent weight of the refractory.

The tendencies shown in FIGS. 1 to 3 are exhibited by both sintered and electro-fused spinels.

Addition of alumina clinker improves erosion resistance and volume stability. One, two, or more alumina clinkers can be chosen from among artificial ones such as sintered and electro-fused alumina and natural ones such as aluminous shale, bauxite and sillimanite. Since $SiO_2$ triggers the production of low melting point products, alumina clinkers containing less $SiO_2$ are preferable. To facilitate the close packing of monolithic refractories, coarse, intermediate and fine particles may be mixed appropriately, with the maximum particle size chosen from within the range of, for example 1 mm to 40 mm.

The amount of alumina clinker in the refractory is 50-90 percent by weight, and or preferably 60-80 percent by weight. Good resistance to erosion and slag penetration is unattainable if the amount is under 50 percent by weight. If the amount exceeds 90 percent by weight, the resulting decrease in the ratio of spinel clinker lowers the resistance to slag penetration.

The content of alumina clinker in conventional monolithic refractories is lower than in the products according to this invention. The resistance of conventional monolithic refractories to erosion etc. depends principally on spinel clinker. In contrast, monolithic refractories of this invention contain more alumina clinker, which when combined with fine-grained spinel clinker greatly increases the resistance to slag penetration.

The alumina cement which is employed in the present invention loan be of the type that is commomly used as a binder for refractories. The particle size is not larger than 180 mesh. The amount employed is 1-25 percent by weight and preferably 3-20 percent by weight. When the amount is less than 1 percent by weight, the alumina cement dose not function as a binder that imparts adequate strength to refractories. When used in an amount greater than 25 percent by weight, $MgO-Al_2O_3$ in the spinel clinker and $CaO-Al_2O_3$ in the alumina cement react with each other to produce a larger amount of products that melt at as low a temperature as about 1350° C., thereby lowering the erosion resistance of the refractories.

One, two, or more magnesia clinkers can be chosen from among natural magnesia and artificial products such as sintered and electro-fused magnesia. Because $SiO_2$ triggers the production of low melting point products, magnesia clinkers containing low amounts of $SiO_2$ are preferable. When the amount of magnesia clinker exceeds 5 percent by weight, the expansion occurring upon the production of spinel becomes too large to maintain volume stability, and metal penetration and refractories spalling may then result. Thus, the preferable amount is 0.5-4 percent by weight.

Though not limited, the particle size should preferably be not be larger than 3 mm. When the particle size is less than 0.1 mm, for example. The hydrating reaction of magnesia clinker gives rise to the problem of digestion undesirable to refractories under some service conditions.

Figure 4:
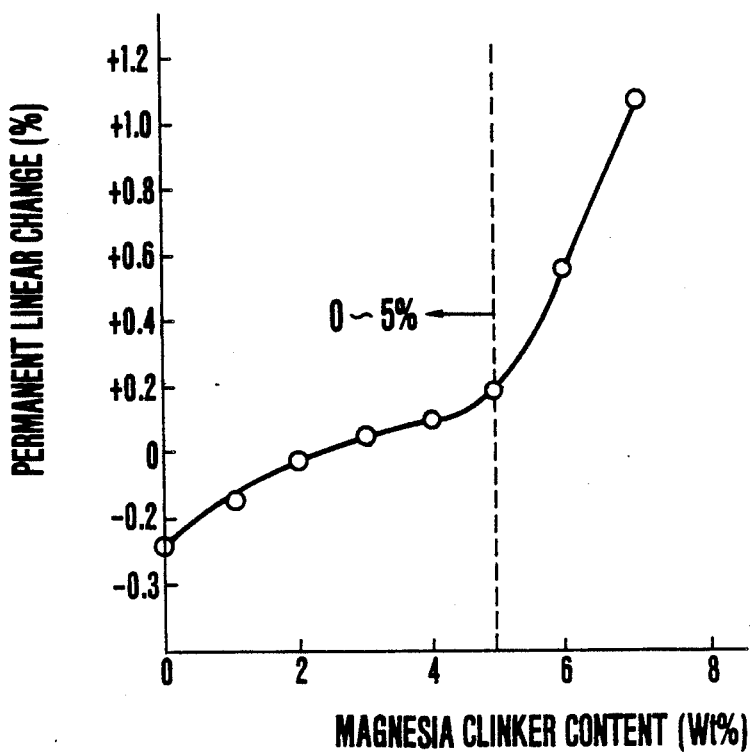
FIG. 4 graphically shows the relationship between the mixing ratio of magnesia clinker and the permanent linear change.

FIG. 4 shows the relationship between the content of sintered magnesia and the permanent linear change of monolithic refractories consisting of 60 percent by weight of sintered alumina, 25 percent by weight of sintered spinel not larger than 0.5 mm in particle size and 15 percent by weight of alumina cement. Clearly, the permanent linear change after firing at 1500° C. is small when the amount of sintered magnesia is kept below 5 percent by weight. Though not shown in the graph, electro-fused magnesia also shows a similar tendency.

The basic compositions of the monolithic refractories according to this invention are as described previously. However, various types of organic, inorganic, metallic and other fibers, metal powders, silica flour, dispersing agents containing phosphate, acrylate and lignin sulfonate and other refractory materials may be added to the extent that they do not detract from the effects of this invention. Especially, up to 4 percent by weight of silica flour effectively improves the strength of alumina spinel monolithic refractories at ordinary temperatures and above. If the addition of silica four exceeds 4 percent by weight, a larger amount of readily meltable products will be produced, thereby lowering the strength and erosion resistance at high temperatures.

The monolithic refractories according to this invention can be cast into frames, with 4-15 percent by weight of water added thereto, according to the conventional method. The packing of the monolithic refractories can generally be facilitated by means of vibrator attached to the frame or a rod vibrator inserted into the refractories. For localized repairs, the monolithic refractories may be applied by troweling, patting or other conventional methods.

A number of examples of this invention will next be described. Table 1 shows the chemical compositions of the refractory materials used in the preparation of the examples.

Table 2 shows the results of tests conducted on the examples of this invention and some conventional monolithic refractories prepared for the purpose of comparison. The tests were performed on monolithic refractories which had been cast and vibrated in frames, together with appropriate quantities of water, and dreid at 110° C. for 24 hours. The test procedures were as follows.

Bending test: According to JIS R 2553
Linear change test: According to JIS R 2554
Rotary erosion test:
Slab: Steel ladle slag=1:1 (by weight)
This test was conducted at 1650° C. for 5 hours, and the amount of erosion and slag penetration were measured.

TABLE 1

| | Chemical Composition of Refractory Materials (percent by weight) | | | | |
|---|---|---|---|---|---|
| | Sintered alumina | Aluminous shale | Sintered spinel | Alumina cement | Sintered magnesia |
| $Al_2O_3$ | 99.3 | 84.5 | 70.0 | 81.5 | — |
| MgO | — | — | 29.6 | — | 98.9 |
| CaO | — | 0.14 | — | 18.5 | — |

TABLE 1-continued

| Chemical Composition of Refractory Materials (percent by weight) | | | | | |
| --- | --- | --- | --- | --- | --- |
| | Sintered alumina | Aluminous shale | Sintered spinel | Alumina cement | Sintered magnesia |
| $SiO_2$ | 0.4 | 9.9 | 0.3 | 0.2 | 0.7 |

TABLE 2

Examples of Present Invention and Conventional Products for Comparison

| | Present Invention | | | | | | | | |
| --- | --- | --- | --- | --- | --- | --- | --- | --- | --- |
| | 1 | 2 | 3 | 4 | 5 | 6 | 7 | 8 | 9 |
| Components of Monolithic Refractories (percent by weight) | | | | | | | | | |
| Sintered alumina, 1–40 mm | 35 | 40 | 30 | 40 | 45 | 50 | 40 | 35 | 40 |
| Sintered alumina, 1 mm max. | | | | 10 | | 15 | 10 | | |
| Sintered alumina, 0.074 mm max. | 17 | 20 | 25 | 20 | 20 | 29 | 20 | 17 | 20 |
| Aluminous shale, 1–40 mm | | | 10 | | | | 5 | | |
| Aluminous shale, 1 mm max. | | | | 5 | 10 | | | | |
| Sintered spinel, 1–3 mm | | | | | | | | | |
| Sintered spinel, 1 mm max. | 40 | | | | | | | 40 | |
| Sintered spinel, 0.5 mm max. | | 30 | 25 | 13 | 5 | 5 | | | 30 |
| Sintered spinel, 0.15 mm max. | | | | | | | 20 | | |
| Sintered magnesia, 1 mm max. | | | | | | | | 0.5 | 1 |
| Alumina cement | 8 | 10 | 15 | 5 | 20 | 1 | 15 | 7.5 | 9 |
| Silica flour | | | | 2 | | | | | |
| Sodium hexametaphosphate (percent by weight of refractories) | | | | | | | | | (0.1) |
| Water Added (percent by weight of refractories) | (7.1) | (6.5) | (7.4) | (7.4) | (7.2) | (6.8) | (7.0) | (6.9) | (7.0) |
| Tests | | | | | | | | | |
| Modulus of rupture ($kg/cm^2$)  Ordinary temperature | 33 | 43 | 41 | 47 | 52 | 30 | 53 | 33 | 40 |
| Modulus of rupture  1400° C. | 58 | 62 | 56 | 65 | 53 | 61 | 58 | 59 | 59 |
| Permanent Linear Change (%) 1500° C. × 3 hours | −0.13 | −0.21 | −0.27 | −0.25 | −0.25 | −0.07 | −0.19 | −0.07 | −0.09 |
| Rotary Erosion  Erosion (mm) | 4.3 | 4.5 | 4.7 | 4.5 | 4.8 | 4.6 | 4.5 | 4.4 | 4.6 |
| Rotary Erosion  Slag Penetration (mm) | 2.8 | 2.2 | 2.3 | 2.0 | 2.1 | 2.4 | 1.9 | 2.7 | 2.3 |

| | Present Invention | | | | Conventional Products for Comparison | | | |
| --- | --- | --- | --- | --- | --- | --- | --- | --- |
| | 10 | 11 | 12 | 13 | 1 | 2 | 3 | 4 |
| Sintered alumina, 1–40 mm | 30 | 40 | 10 | 50 | 30 | 50 | 30 | 50 |
| Sintered alumina, 1 mm max. | | 10 | 10 | 10 | | 19 | | 5 |
| Sintered alumina, 0.074 mm max. | 25 | 20 | 10 | 25 | 15 | 20 | 12 | |
| Aluminous shale, 1–40 mm | 10 | 5 | 40 | | | | | |
| Aluminous shale, 1 mm max. | | 5 | | | | | | |
| Sintered spinel, 1–3 mm | | | | | 40 | | | |
| Sintered spinel, 1 mm max. | | | | | | | | |
| Sintered spinel, 0.5 mm max. | 20 | 12 | 15 | 5 | 1 | 1 | 50 | |
| Sintered spinel, 0.15 mm max. | 8 | | | | | | | |
| Sintered magnesia, 1 mm max. | 2 | 3 | 5 | 5 | | | | |
| Alumina cement | 5 | 5 | 10 | 5 | 10 | 10 | 8 | 30 |
| Silica flour | | | | | | | | |
| Sodium hexametaphosphate (percent by weight of refractories) | (0.1) | (0.1) | | | | (0.1) | | |
| Water Added (percent by weight of refractories) | (7.2) | (7.5) | (7.8) | (6.9) | (6.8) | (6.7) | (7.7) | (7.6) |
| Tests | | | | | | | | |
| Modulus of rupture ($kg/cm^2$) Ordinary temperature | 32 | 29 | 40 | 32 | 43 | 42 | 35 | 64 |
| Modulus of rupture 1400° C. | 54 | 52 | 51 | 57 | 50 | 52 | 49 | 17 |
| Permanent Linear Change (%) 1500° C. × 3 hours | +0.07 | +0.11 | +0.17 | +0.20 | −0.11 | +0.17 | −0.10 | −0.45 |
| Rotary Erosion  Erosion (mm) | 4.7 | 4.7 | 4.9 | 4.4 | 4.9 | 5.3 | 5.0 | 7.8 |
| Rotary Erosion  Slag Penetration (mm) | 2.1 | 2.2 | 2.4 | 2.4 | 4.2 | 5.2 | 5.3 | 3.1 |

Due to higher resistance to erosion and slag penetration, the alumina-spinel monolithic refractories according to this invention proved to be at least 1.8 times more durable than the conventional products.

Therefor, the alumina-spinel monolithic refractories of this invention are very useful in today's industrial environments in which furnaces are used under increasingly severe conditions and the need to reduce refractories consumption grows increasingly acute.

The monolithic refractories according to this invention can be used not only for ladles, vacuum degassing vessels and hot-metal mixers but also for other equipment conventionally lined with monolithic refractories such as blast-furnace troughs and their covers, hot-metal mixer cars and tundishes.

What is claimed is:

1. An alumina-spinel monolithic refractory consisting essentially of 50–90 percent by weight of alumina clinker, 5–40 percent by weight of $MgO-Al_2O_3$ spinel clinker not larger than 1 mm in particle size and 1–25 percent by weight of alumina cement.

2. An alumina-spinel monolithic refractory consisting essentially of 50–90 percent by weight of alumina clinker, 4–40 percent by weight of $MgO-Al_2O_3$ spinel clinker not larger than 1 mm in particle size, 1–25 percent by weight of alumina cement and not more than 5 percent by weight of magnesia clinker.

3. An alumna-spinel monolithic refractory consisting essentially of 50–90 percent by weight of alumina clinker, 5–40 percent by weight of $MgO-Al_2O_3$ spinel clinker not larger than 1 mm in particle size, 1–25 percent by weight of alumina cement and up to 4 percent by weight of silica flour.

4. An alumina-spinel monolithic refractory consisting essentially of 50–90 percent by weight of alumina clinker, 5–40 percent by weight of $MgO-Al_2O_3$ spinel clinker not larger than 1 mm in particle size, 1–25 percent by weight of alumina cement, not more than 5 percent by weight of magnesia clinker and up to 4 percent by weight of silica flour.

5. An alumina-spinel monolithic refractory according to claim 1, in which the mole ratio of MgO to $Al_2O_3$ in the $MgO-Al_2O_3$ spinel clinker is within the range of 0.7:1.3–1.3:0.7.

6. An alumina-spinel monolithic refractory according to claim 2 in which the mole ration of MgO to $Al_2O_3$ in the $MgO-Al_2O_3$ spinel clinker is within the range of 0.7:1.3–1.3:0.7.

7. An alumina-spinel monolithic refractory according to claim 3 in which the mole ratio of MgO to $Al_2O_3$ in the $MgO-Al_2O_3$ spinel clinker is within the range of 0.7:1.3–1.3:0.7.

8. An alumina-spinel monolithic refractory according to claim 4 in which the mole ratio of MgO to $Al_2O_3$ in the $MgO-Al_2O_3$ spinel clinker is within the range of 0.7:1.3–1.3:0.7.

* * * * *